UNITED STATES PATENT OFFICE.

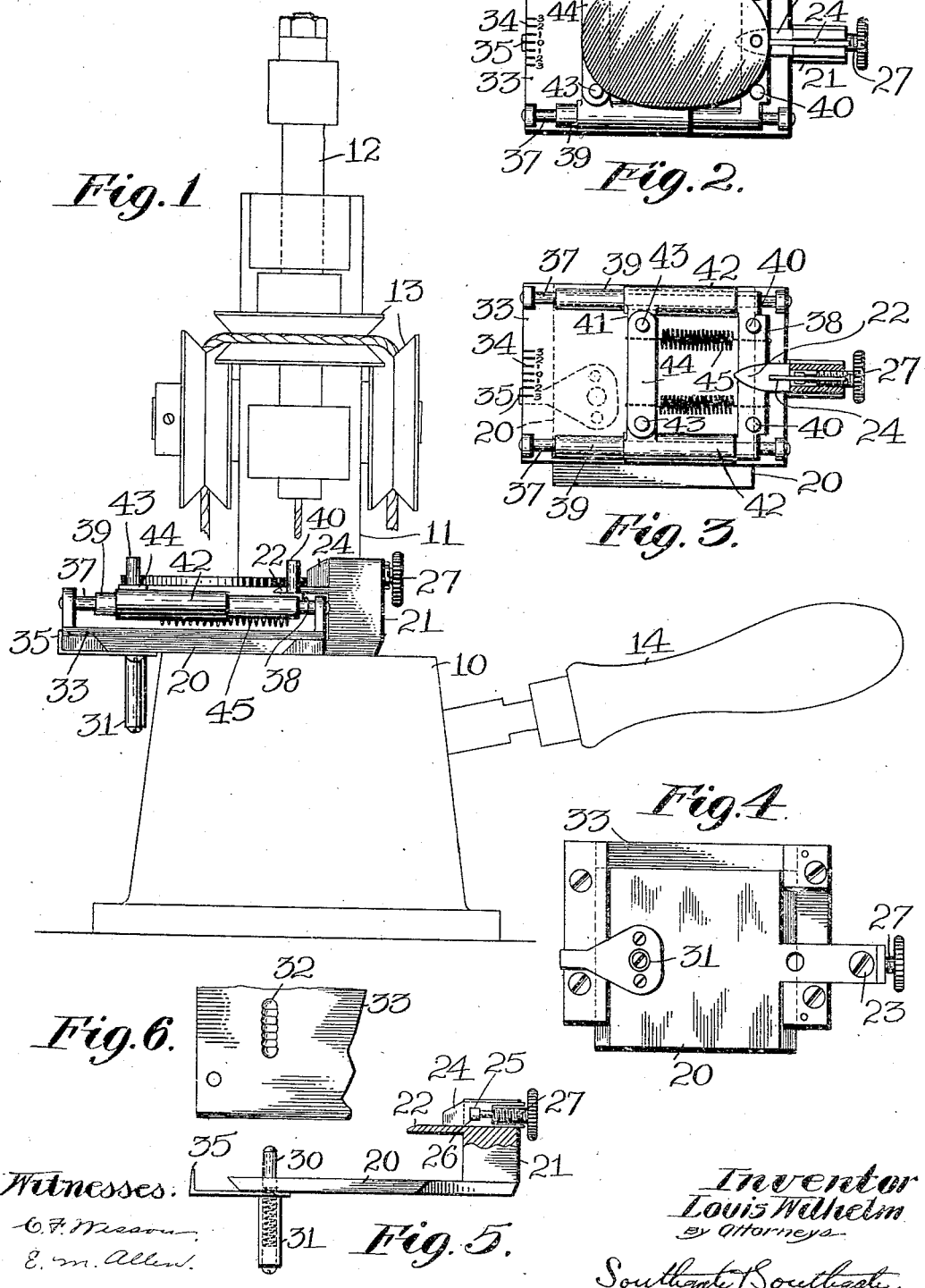

LOUIS WILHELM, OF WORCESTER, MASSACHUSETTS, ASSIGNOR TO GLOBE OPTICAL COMPANY, OF BOSTON, MASSACHUSETTS, A CORPORATION OF MASSACHUSETTS.

LENS-DRILLING DEVICE.

943,289.   Specification of Letters Patent.   Patented Dec. 14, 1909.

Application filed March 3, 1909. Serial No. 481,178.

*To all whom it may concern:*

Be it known that I, LOUIS WILHELM, a citizen of the United States, residing at Worcester, in the county of Worcester and State of Massachusetts, have invented a new and useful Lens-Drilling Device, of which the following is a specification.

This invention relates to a machine for drilling lenses for eye glasses, spectacles and the like.

The principal objects of the invention are to provide a simple, convenient and universally adjustable support for the lenses which will hold the portion of the lens to be drilled in such a way that there will be substantially no tendency on the part of the drill to crack the lens when it comes into contact with it and to provide a lens holding device of such a character that successive lenses can be drilled in the same place by the use of gages and that lenses of substantially all sizes can be held in proper position with respect to the drill.

Further objects and advantages of the invention will appear hereinafter.

Reference is to be had to the accompanying drawings in which—

Figure 1 is a front elevation showing an ordinary drill press in outline and illustrating one form of the present invention in position thereon. Fig. 2 is a plan of the work holding device and gages and the like showing a lens therein. Fig. 3 is a similar view of the parts with the lens removed. Fig. 4 is a bottom plan of the same. Fig. 5 is an elevation of certain portions thereof, and Fig. 6 is a fragmentary bottom plan of one of the elements.

The invention is shown as being placed on a machine having a base 10, standard 11, drill spindle 12, driving pulleys 13 and handle 14 for bringing the drill down on the work. These parts are not illustrated in detail as they may be constructed in any desired form. Mounted on the base is a stationary plate 20 having at one end thereof a block 21 provided with a projecting end 22 constituting a support for the end of the work. This block is mounted on the plate 20 by means of a vertical screw 23 so that the block can be turned and adjusted to the proper angle with respect to the rest of the apparatus, but after adjustment it is stationary and it will be referred to as a stationary work support. Mounted on this support is an edge gage 24 having a perforation 25 in which is the head 26 of an adjusting screw 27. The adjusting screw is mounted in screw-threads on the stationary support and by turning it the gage moves out and in along the upper flat surface of the projecting portion 22. Carried also at the end of said plate is a plunger 30 having a spring located in a cylinder 31 projecting downwardly and normally urging the plunger upward into engagement with the rack 32 on the bottom of the plate 33. This plate 33 is mounted on the plate 20 being provided with gibs to hold it in position thereon and is adapted to move back and forth. Its motion is registered by a scale 34 on the plate 33 and a stationary pointer 35 secured to the bottom of the plate 20. The projecting part of the plate 20 on which the block 21 is mounted constitutes a stop for the plate 33 as will appear from an inspection of Fig. 4.

The plate or slide 33 is provided with guides 37 preferably in the form of two longitudinal parallel bars at the sides. On this guide moves a cross bar 38. This cross bar has two cylindrical hollow sleeves 39 each frictionally fitting one of the guides 37 so that the cross bar is adapted to slide along the latter a distance regulated by the length of the sleeves. This cross bar is provided with two pins 40 for engaging the edges of the lens and holding it in position. Sliding on the sleeves 39 is another cross bar 41 which also has two sleeves 42 sliding on the sleeves 39. The cross bar 41 is capable of a certain motion with respect to the sliding plate limited by the length of the sleeves on one side and by the ends of the guides 37 on the other. This bar is also provided with pins 43 for engaging the edges of the lens. In addition to this, this bar is provided with a plate 44 preferably of hard rubber or other convenient material for supporting the lens. This is intended to be of substantially the same height above the cross bar as the stationary support 22 is above the other cross bar and the lens is intended to be held on this plate and the support 22 and between the four pins. It will be observed that the two cross bars are connected by springs 45 so as normally to pull them as near together as possible.

In setting a lens up in the machine, the cross bar 38 is first moved to the left and the lens placed in position just projecting over the edge of the stationary support 22. The springs normally pull up the cross bar 41 so as to securely hold the lens and then the gage 24 having been set to the proper position, the cross bar 38 with the lens is pushed up until the edge of the lens engages the gage 24. The slide 33 is moved to one side or the other until the pointer 35 shows that it is in proper position. A plurality of lenses can be put into the machine successively and drilled in the same position without resetting the gage and without taking any particular pains as to the location of the lenses in the holder.

While I have illustrated and described a preferred embodiment of the invention, I am aware that many modifications can be made therein by any person skilled in the art without departing from the scope of the invention as expressed in the claims. Therefore, I do not wish to be limited to all the details shown and described but What I do claim is:—

1. In a lens drilling machine, the combination of a stationary support for one end or side of the work, a drill movable vertically toward said stationary support, and a movable work holder for the lens projecting under the end of the stationary support.

2. In a lens drilling machine, the combination of a stationary support for one end or side of the lens, a drill movable toward and from said stationary support, a work holder for the lens movable under the end of the stationary support, and an adjustable gage for the edge of the lens carried by said stationary support and movable longitudinally toward and from the work-holder.

3. In a lens drilling machine, the combination of a base or standard, a drill movable vertically thereon, a support for one end or side of the lens adjustable about a vertical axis, a gage for the end of the lens movable longitudinally along the top of said support, and a screw on the support for adjusting the gage.

4. In a lens drilling machine, the combination of a base or standard, a drill movable vertically thereon, a support for one end or side of the lens, a gage for the end of the lens movable along the top of said support, a screw on the support for adjusting the gage, said support having a projecting end toward which said gage moves, and a work-holder movable longitudinally and laterally under said projecting edge.

5. In a lens drilling machine, the combination of a laterally movable plate having a scale on one end thereof, a stationary pointer adjacent to said scale, a longitudinal guide on the plate, a cross bar movable along the guide and having pins for engaging the edge of the lens, a second cross bar movable freely along said guide and having pins for engaging the opposite ends or sides of the lens, and an independent longitudinally adjustable gage adjacent to the first named cross-bar.

6. In a lens drilling machine, the combination of a laterally movable plate having a scale on one end thereof, a stationary pointer adjacent to said scale, a longitudinal guide on the plate, a cross bar movable along the guide and having pins for engaging the edge of the lens, and a second cross bar movable freely along said guide and having pins for engaging the opposite ends or sides of the lens.

7. In a lens drilling machine, the combination of a laterally movable plate having a scale on one end thereof, a stationary pointer adjacent to said scale, a longitudinal guide on the plate, a cross bar movable along the guide and having pins for engaging the edge of the lens, a second cross bar movable freely along said guide and having pins for engaging the opposite ends or sides of the lens, and springs between said cross bars for normally holding them together.

8. In a lens drilling machine, the combination of a base or standard, a plate laterally movable thereon, a spring-pressed means for normally holding said plate in adjusted positions, a pair of parallel longitudinal guides located near the edges of said plate, a cross-bar having two hollow cylindrical projections on said guide and freely movable therealong and provided with pins for engaging the edge of the lens, a second cross bar having hollow cylindrical projections slidably mounted on the first named cylindrical projections and provided with pins for engaging the edge of the lens, springs for normally forcing the second cross-bar toward the first named cross-bar, a plate located between the pins on the second cross-bar to elevate the lens above said cross-bar, and a stationary support adapted to project over the other cross-bar for supporting the other end or side of the lens in the same plane.

In testimony whereof I have hereunto set my hand, in the presence of two subscribing witnesses.

LOUIS WILHELM.

Witnesses:
Fred W. Stevens,
Chas. A. Nichols.